Oct. 5, 1954 — M. MOSES — 2,690,589
SAUSAGE STUFFER
Filed March 5, 1951
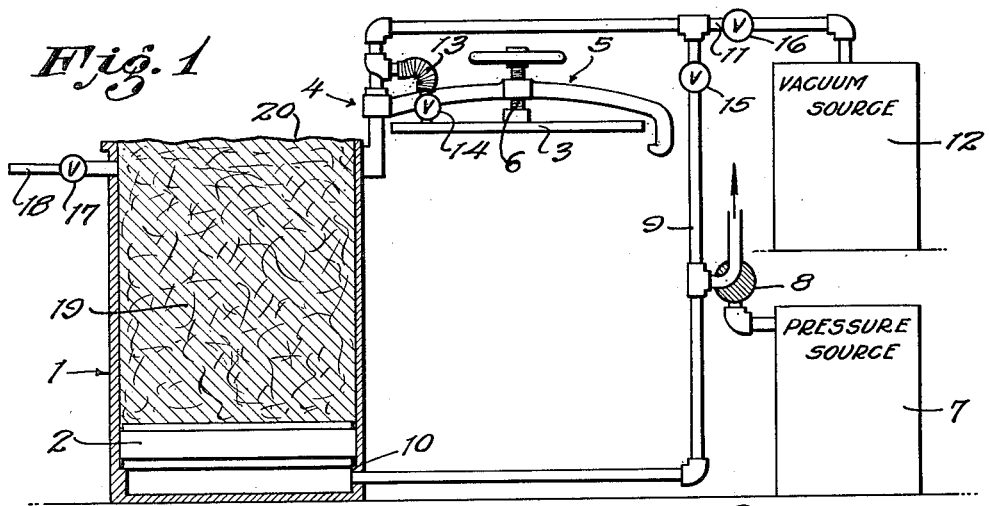
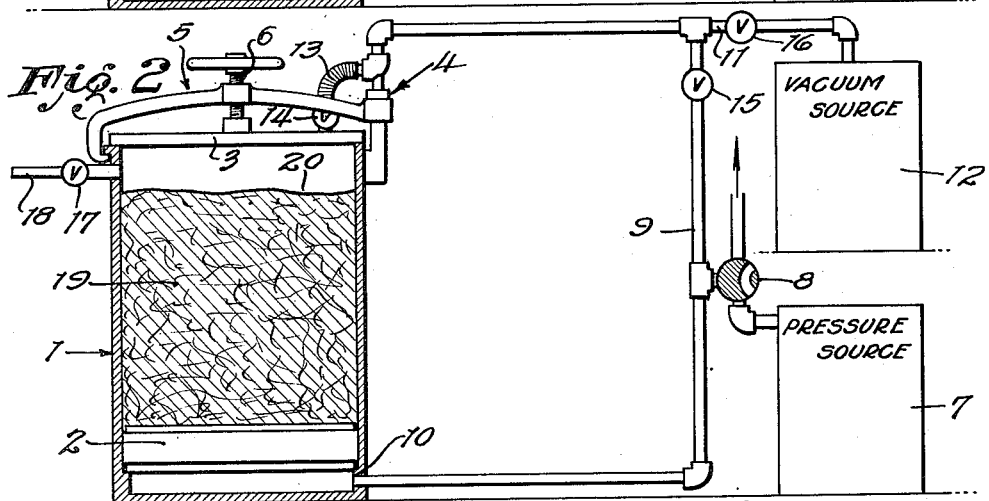
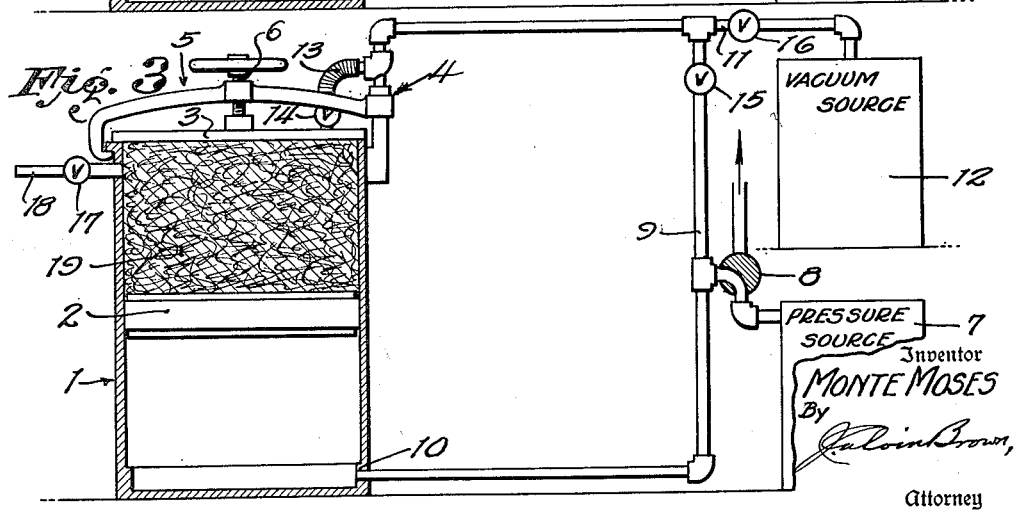
Inventor
MONTE MOSES
By
Attorney Patented Oct. 5, 1954

2,690,589

UNITED STATES PATENT OFFICE 2,690,589

SAUSAGE STUFFER

Monte Moses, Los Angeles, Calif.

Application March 5, 1951, Serial No. 213,911

3 Claims. (Cl. 17—39)

The present invention relates to what is known as stuffers as used in the meat industry.

It is common in the meat industry to provide pneumatic stuffers of large capacity, say 500 pounds. These stuffers generally comprise a cylinder having a honed cylindrical bore provided with a piston movable within said bore under pneumatic pressure. In addition the cylinder is provided with a cover which is held thereto by a swing yoke assembly, which yoke may be securely locked to the cylinder. In addition, and at the top of the cylinder and communicating with the interior thereof, are stuffing outlets to which valves and stuffing horns are connected. The stuffing horns are utilized for the purpose of directing the food product from the cylinder, when the piston is moved in the bore thereof, to fill cans or casings to a certain weight with a meat product. Ordinarily the meat product having been chopped by what is known as a silent cutter, and another portion of the formula of the meat product having been ground by a grinder, is then blended together in a mixer. In the case of a meat product which is to be canned it is necessary that the mixer be vacuumized so that the meat product which is to be canned is free from air. The method as now practised is for the meat product as a mass to be vacuumized in the mixer followed by transferring the meat product into a stuffer. The transference of the meat product into the stuffer causes a certain degree of air to be admixed with the product. The presence of air in the meat product is detrimental and causes spoilage thereof when the product is canned.

An object of the present invention is to eliminate use of a mixer which must act under vacuum conditions while mixing the meat product, and to eliminate the double handling of the meat product which causes air to admix with the product.

For the benefit of those who are not familiar with the meat industry, it is customary in the forming of so-called luncheon meats, to grind and chop the particular meat and admix same with flour and other ingredients. The resultant product resembles a heavy emulsion. This heavy emulsion is then transferred by shoveling the emulsion from the mixer into the stuffer. The stuffer, when the cover is closed over the cylinder, has a pneumatically operated piston which moves upwardly within the cylinder to force the emulsion through the stuffing horns and into the cans. With the present invention the stuffer is so arranged and constructed that air in said emulsion is removed therefrom, the emulsion then passed through the stuffing horns and into cans free of entrapped air. It is evident that, in the ordinary practice, if air is left in the can, or in the meat product after the can has been sealed, and the meat product cooked in the can, a spoilage would occur due to lack of a vacuum. The present invention assures that this will not occur as the meat product placed within the can is free of entrapped air, and the vacuum applied to the can during the application of a cover thereto, removes any air from the container and which may surround the meat product.

Further objects comprise a method and means for removing air from meat products, particularly of the ground type, which is inexpensive of construction, efficient in operation, and generally superior to methods and devices now known to the inventor.

In the drawing, the several figures are diagrammatic, and of which:

Figure 1 is illustrative of a stuffer cylinder and connections with the said cylinder for causing a vacuum therein.

Figure 2 shows certain valves closed and other valves opened for the purpose of placing the interior of the stuffer cylinder under vacuum, and Figure 3 is illustrative, certain of the vacuum valves being closed while pressure is applied beneath the piston within the stuffer cylinder.

Referring now with particularity to the drawings, I have shown at 1 a cylinder having a cylindrical bore and within which cylinder is a piston 2. This piston has a tight fit engagement with the cylindrical wall bounding the bore.

It may be said that the figures are purely diagrammatic and do not illustrate any particular construction for the cylinder or its cover 3, the usual procedure being to provide the cylinder with a mounting 4 for a swing yoke 5 which diametrically spans the cylinder and which yoke centrally carries a screw shaft 6 which is fastened centrally to the cover, the opposite end of the shaft carrying a hand lever or wheel. The cylinder and swing yoke interlock diametrically opposite the mounting 4 whereby the cover may tightly close over the upper end of the cylinder.

I have provided a source of pressure at 7 which may be a pressure tank connected with a compressor whereby air under pressure may be delivered within said cylinder and below the piston for the purpose of raising the piston within the cylinder. This pressure source, whatever its character, is connected through a valve 8 to piping 9 leading to the interior of the cylinder beneath the piston 2 as shown at 10. The piping 9 is in communication with piping 11 which leads to a source of vacuum 12. This source of vacuum may comprise a tank and a compressor utilized for exhausting the tank of air or may be of any form of vacuum pump having a sufficient capacity to vacuumize the meat product within the cylinder 1. The vacuum should equal at least 29 inches of mercury. To accomplish this the pipe 11 which leads to the vacuum source communicates with a flexible hose 13 attached to a valve 14 on the cover 3. Interposed within the piping 9 is a valve 15 and between the source of vacuum and piping 9 is a valve 16.

The operation, uses and advantages of the invention just disclosed are as follows:

As shown the cylinder 1 is provided with stuffing cock or cocks 17 which control passage of meat product from the cylinder through stuffing horn or horns 18. A meat emulsion 19 of the character which is ordinarily used for luncheon meats, is placed within the cylinder 1 to say the height indicated in Figure 1 at 20. The piston 2 is at its lowermost position within the cylinder and the meat product is resting thereon. The cover is then moved from the position shown in Figure 1 to a closed position over the cylinder and secured in air tight engagement therewith. As the meat emulsion settles, the level 20 gradually lowers from the position shown in Figure 1 to the position shown in Figure 2 while the cover 3 is thus being secured. The valve shown at 8 is moved to the position shown in Figure 2, which does not permit any air or other medium under pressure to pass through said valve into the line 9. The valves at 14, 15 and 16 are opened, thereby placing the zone beneath the piston and the zone included between the top of the meat product and the cover under vacuum. The valve at 17, is of course, closed. The vacuum gauge will read zero, but as air is exhausted from the cylinder the vacuum gauge will move and when the desired vacuum is reached, the valves 14, 15, 16 are closed. The piston, of course, is prevented from moving within the container and lifting the meat product due to the fact that the zone included between the piston and the bottom of the cylinder is under vacuum, that is to say under the same negative pressure as that portion included between the top of the meat product and the cover. As this meat product is in emulsion form, any entrapped air within the meat product readily leaves the same and escapes from the meat product with the result that the meat product is free of entrapped air. After the valves 16, 14, and 15 have been closed, the valve 8 may be turned, see Figure 3, so that air under pressure is admitted into the piping 9 from the pressure source 7 to raise the piston within the cylinder, and the meat product under pressure and free of air is directed past valves 17 into the stuffing horn or horns 18 and thence into cans.

Thus with the present invention the use of a mixer maintained under vacuum conditions is not necessary, thus eliminating one piece of expensive apparatus as well as overcoming the labor of double handling.

I claim:

1. A meat stuffer comprising a cylindrical casing having discharge means near one end thereof, a piston fitting said casing and movable from the other end of the casing toward the discharge end, means connected to the discharge end of the casing for applying suction to the discharge end of the casing and connected also between said other end of the casing and the piston to prevent the piston from moving toward the discharge end under urge of the suction applied to the discharge end, and means connected to said first mentioned means for applying suction for changing the pressure at said other end of the casing from suction to positive pressure, whereby when the casing is filled with meat emulsion containing entrapped air, the air will be removed from the emulsion by the suction, after which the piston may be subjected to positive pressure with the suction cut off, so the meat emulsion, now freed of its entrapped air, will be discharged through said discharge means.

2. The meat stuffer of claim 1 in which the cylindrical casing is vertical, the discharge means includes a valved stuffing horn located at the upper end of the casing, the suction means provides a vacuum equal to at least 29" of mercury, and the means for changing the pressure includes a pressure source and valved piping connecting the casing below the piston with the suction means whereby the space below the piston may be opened selectively to the atmosphere, the pressure source, or the vacuum source.

3. The combination with a meat stuffer of large capacity and having a vertical cylinder, a valved stuffing horn at the top thereof, a piston freely movable up and down in the cylinder to support a charge of meat emulsion containing entrapped air, a source of vacuum giving a suction equal to at least 29" of mercury, a pressure source, valved piping connecting the vacuum source to the casing at its upper end to exhaust the entrapped air from the meat emulsion, valved piping for selectively connecting the pressure source to the casing below the piston to cause the piston to rise and force the meat emulsion through the valved stuffing horn or to open the space below the piston to the atmosphere, and means for preventing upward movement of the piston while the meat emulsion is being freed of its entrapped air by said vacuum: said preventing means including a valved connection between the pressure piping and the vacuum piping, whereby the space below the piston may be closed to the pressure source and to the atmosphere and be opened to the vacuum source while the meat emulsion is being freed of its entrapped air, and then be closed to the vacuum and be opened to the pressure, and the vacuum piping to the upper end of the cylinder may be closed when the stuffing horn valve is open.

References Cited in the file of this patent

UNITED STATES PATENTS

| Number | Name | Date |
| --- | --- | --- |
| 893,808 | Napier | July 21, 1908 |
| 1,697,583 | Winter | Jan. 1, 1929 |
| 1,731,041 | Bragg et al. | Oct. 8, 1929 |
| 2,021,831 | Brightbill | Nov. 19, 1935 |
| 2,105,196 | McCauley | Jan. 11, 1938 |
| 2,179,676 | Vogt | Nov. 14, 1939 |
| 2,250,707 | Gross | July 29, 1941 |
| 2,309,345 | Hunn et al. | Jan. 26, 1943 |
| 2,348,176 | Gott et al. | May 2, 1944 |